Patented July 18, 1950

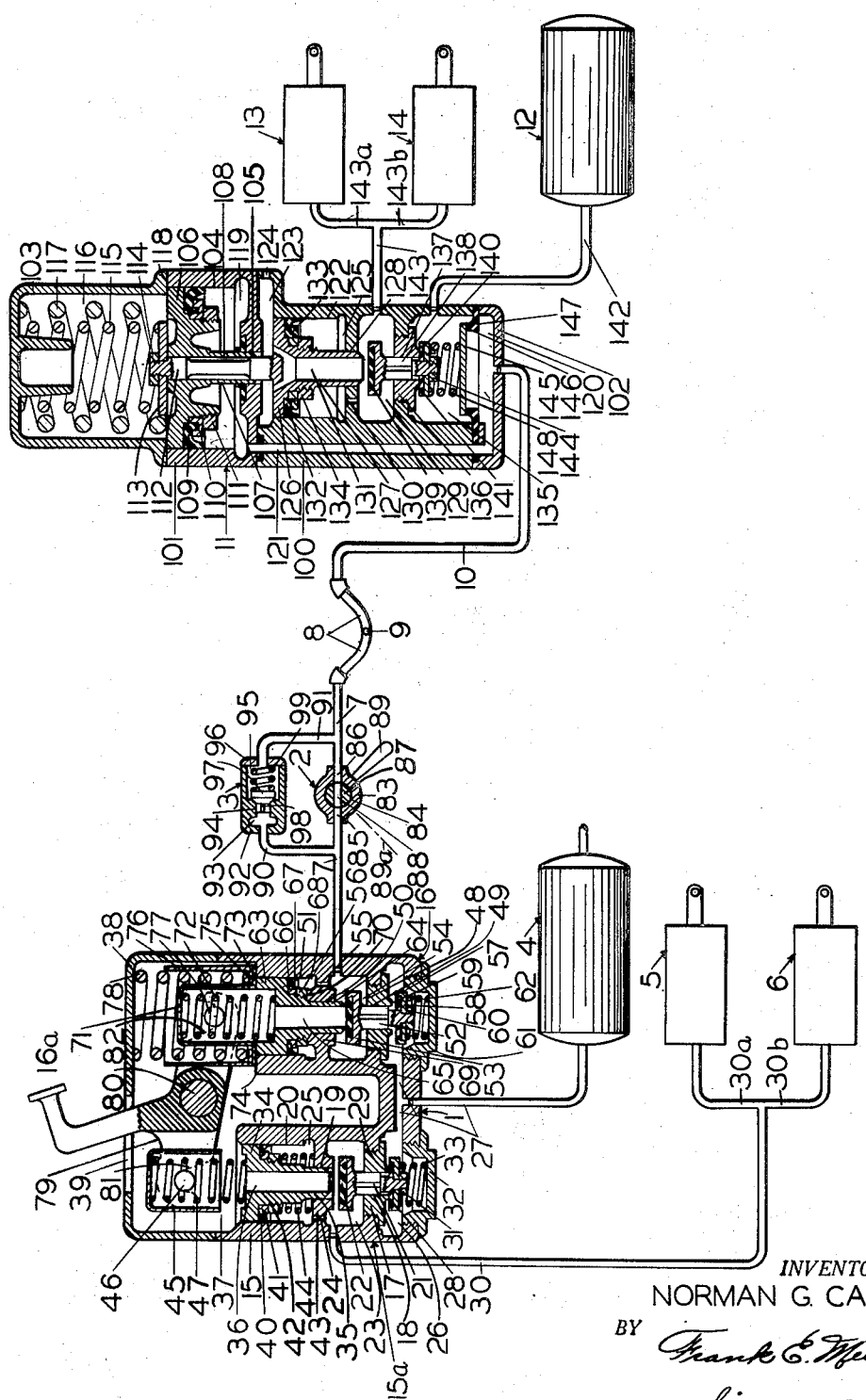

2,515,946

UNITED STATES PATENT OFFICE 2,515,946

FLUID PRESSURE BRAKE APPARATUS

Norman G. Cadman, London, England, assignor, by mesne assignments, to The Westinghouse Air Brake Company, Wilmerding, Pa., a corporation of Pennsylvania Application May 22, 1947, Serial No. 749,732
In Great Britain June 5, 1946

2 Claims. (Cl. 303—26)

This invention relates to fluid pressure brake apparatus and more particularly to the empty and load type for braking tractor-trailer vehicles.

One object of the invention is to provide an improved brake equipment of the above type.

Another object of the invention is the provision of a tractor-trailer brake equipment of the above type arranged to be controlled by an operator's control device on the tractor for braking both the tractor and trailer when the trailer is loaded, and the tractor only when the trailer is empty.

Another object of the invention is the provision of a brake equipment such as just defined so constructed as to automatically apply the brakes on the trailer, in case a brake control pipe between the tractor and trailer ruptures, when the the trailer is empty as well as when loaded.

Other objects and advantages will be apparent from the following more detailed description of a preferred embodiment of the invention taken together with the accompanying drawing forming a part of the specification.

Description

Referring to the drawing, the single figure is a diagrammatic view, mainly in section, illustrating a preferred embodiment of my invention.

As shown in the drawing, the tractor brake equipment comprises an operator's control valve device 1 and a cut-out cock 2 adapted to be located in the cab of the tractor, a check valve device 3 connected in by-passing relation to the cut-out cock 2, a main reservoir 4 adapted to be charged with fluid under pressure in any conventional manner and a pair of tractor brake cylinders 5 and 6. A brake pipe 7 extending from the operator's control valve 1 is connected through the cut-out cock 2, when it occupies the open position in which it is shown in the drawing, to the rear end of the tractor. A flexible hose connection 8 and coupling 9 connect the tractor brake pipe 7 to a corresponding brake pipe 10 on the trailer which extends to an automatic control valve device 11 located on the trailer.

The trailer brake equipment further comprises a trailer reservoir 12 and a pair of trailer brake cylinders 13 and 14.

Considering the parts of the equipment in greater detail, the operator's control valve 1 comprises a body 15 containing a straight air portion 15a for controlling operation of the tractor brakes and an automatic portion 16 for controlling operation of the trailer brakes. A manually operable foot pedal 16a is provided to control operation of the straight air portion 15a and the automatic portion 16.

The straight air portion 15a comprises a plug member 17 secured in the body 15 by screw-threaded engagement therewith. The member 17 has a bore 18 which is coaxial with a bore 19 and a large bore 20 each formed in the body 15. Slidably mounted in bore 18 is a fluted stem 21 having formed at one end thereof an exhaust valve 22 which is disposed in a chamber 23 formed in body 15. A small passage 24 connects chamber 23 to a chamber 25 formed at the lower end of bore 20. The other end of stem 21 extends into a chamber 26, which is adapted to be supplied with fluid under pressure from main reservoir 4 through a pipe and passage 27, and wherein a supply valve 28 is provided on the end of said stem for cooperation with a seat 29 formed on member 17 to control communication between said chamber and chamber 23 to which is connected a pipe 30 having branches 30a and 30b leading to the truck brake cylinders 5 and 6, respectively. The supply valve 28 is secured to stem 21 by a nut 31 having screw-threaded engagement with said stem. The outer end wall of chamber 26 is closed by a cap 32 having screw-threaded engagement with the body 15, and supported by said cap and bearing against valve 28 is a spring 33 for urging said valve to a seated position.

Slidably mounted in bore 20 is a piston 34 provided with a stem 35 extending through chamber 25 with its end slidably mounted in bore 19. An axial bore 36 extends through piston 34 and stem 35, said bore being open at one end to chamber 23 and at the opposite end to a chamber 37 formed between the body 15 and a cover member 38. The chamber 37 is open to atmosphere through a slot 39 provided in cover member 38 for the foot pedal 16a. The piston 34 is provided with a packing cup 40 which has sealing and sliding contact with the wall of bore 20 and which is clamped to said piston by a follower 41 and a nut 42 having screw-threaded engagement with stem 35.

Disposed in bore 20 and chamber 25, between nut 42 and a wall 43, separating chambers 23 and 25, is a spring 44 for urging the end of stem 35 out of engagement with exhaust valve 22 to provide a fluid pressure release passageway between the tractor brake cylinders 5 and 6 and the atmosphere through pipe 30, chamber 23, bore 35, chamber 37 and slot 39 in cover 38. Disposed at the upper side of piston 34 and between said piston and a spring cage 45 having a pair of oppositely disposed lugs 46 (only one lug being shown in the drawing) is a regulating spring 47 for the straight air portion 15a.

The automatic portion 16 comprises a plug member 48 secured in the body 15 by screw-threaded engagement therewith. The member 48 has a bore 49 which is coaxial with a bore 50 and a larger bore 51 each formed in the body 15. Slidably mounted in the bore 49 is a fluted stem 52 having formed at one end thereof an exhaust valve 53 which is disposed in a chamber 54 formed in the body 15. A small passage 55 connects chamber 54 to a chamber 56 formed at the lower end of bore 51. The other end of stem 52 extends into a chamber 57 adapted to be supplied with fluid under pressure from the main reservoir 4 through the pipe and passage 27, and which chamber contains a supply valve 58 provided on the end of said stem for cooperation with a seat 59 formed on member 48 to control communication between said chamber and chamber 54 to which is connected brake pipe 7 leading to the automatic control valve 11 located on the trailer. Supply valve 58 is secured to stem 52 by a nut 60 having screw-threaded engagement with said stem. The outer end wall of chamber 57 is closed by a cap 61 having screw-threaded engagement with body 15, and supported by said cap and bearing against valve 58 is a spring 62 for urging said valve to a seated position.

Slidably mounted in bore 51 is a piston 63 provided with a stem 64 extending through bore 50 into chamber 54, said piston and stem having an axial bore 65 open at one end to chamber 54 and open at the opposite end to chamber 37 which is open to the atmosphere as hereinbefore explained. The end of stem 64 is arranged to cooperate with the release valve 53 to control communication between bore 65 and chamber 54.

The piston 63 is provided with a packing cup 66 which has sealing and sliding contact with the wall of bore 51 and which is clamped to said piston by a follower 67 and a nut 68 having screw-threaded engagement with stem 64.

Formed in body 15 between chambers 54 and 56 is a wall 69 having formed thereon a stop 70 for engagement by the nut 68 to limit downward movement of piston 63 and stem 64.

Disposed at the upper side of piston 63 and between said piston and a spring cage 71 is a light spring 72. The spring cage 71 is provided with a flange 73 which rests on the upper end of piston 63 and normally on a stop 74 formed on the body 15. Resting on flange 73 of spring cage 71 is a flange 75 of a second spring cage 76 having a pair of oppositely disposed lugs 77, only one of which is shown in the drawing. Disposed between the flange 75 and the cover member 38 is a heavy control spring 78 for normally maintaining flange 75 in contact with flange 73 and flange 73 in contact with stop 74 and piston 63 to hold the piston stem seated against the exhaust valve 53 and to actuate said valve to open the supply valve 58.

An operating lever 79 formed integral with pedal 16a and fulcrumed intermediate its ends on a shaft 80 carried in cover member 38, is provided for controlling operation of the straight air portion 15a and automatic portion 16. The opposite ends of the lever 79 are bifurcated to straddle respectively, the spring cages 45 and 76, one end of the lever having downwardly opening slots 81 to engage the lugs 46 on spring cage 45, while the other end has upwardly opening slots 82 to engage the lugs 77 of spring cage 76.

The cut-out cock 2 comprises a body 85 interposed between the two sections of brake pipe 7 and having a bore 84 and two passages 85 and 86 leading from said bore to the exterior of said body to the two brake pipe sections 7. Disposed in the bore 84 is a key 87 having a passage 88 adapted to be aligned with passages 85 and 86 for opening communication through the brake pipe 7, i. e. between the brake pipe sections. A handle 89 is provided for movement from an open position in which it is shown in the drawing to a position indicated by a dot and dash line 89a to turn the key 87 to a closed position in which port 88 therein is out of registry with passages 85, 86 for closing communication through the brake pipe 7.

Disposed in by-passing relation to the cut-out cock 2 is the check valve device 3 being connected to the brake pipe 7 by branch pipes 90 and 91 at either side of cut-out cock 2. The check valve device 3 comprises a body 92 having a chamber 93 to which the pipe 90 is connected. A bore 94 extending through body 92 is open at one end to chamber 93 and at the opposite end to a chamber 95 formed by body 92 and a cover 96. Disposed in chamber 95 is a check valve 97 having a fluted stem 98 slidably mounted in bore 95 and arranged to seat on the body around said bore.

A spring 99 disposed between cover 96 and check valve 97 is provided to urge said valve to its seat.

The automatic control valve device 11 located on the trailer comprises two casing sections 100 and 101 secured to each other and two covers 102 and 103 secured to opposite ends of, respectively, said casing sections. Casing section 101 is provided with a large bore 104 which is coaxial with a small bore 105 also formed in casing section 101. Slidably mounted in bore 104 is a piston 106 having a stem 107 slidably mounted in the smaller bore 105. Piston 106 and stem 107 are provided with an axial through bore 108. Piston 106 is further provided with a packing cup 109 which has sealing and sliding contact with the wall of bore 104 and which is clamped to said piston by a follower 110 and a nut 111 having screw-threaded engagement with stem 107.

Slidably mounted in bore 108 is a rod 112, the upper end of this rod being provided with a disc 113 which is secured to said rod by a nut 114 having screw-threaded engagement with said rod. The disc 113 is normally held in contact with the upper face of piston 106 by a spring 115 disposed in a chamber 116 formed between the piston 106 and cover 103. A heavy spring 117, encircling spring 115 in chamber 116, is interposed between piston 106 and cover 103. The cover overlaps the adjacent end of bore 104 to provide a stop 118 for engagement by piston 106 to limit the upward movement thereof. The lower end of bore 104 terminates in a chamber 119 which is open to the trailer brake pipe 10 through a passage 121 and a chamber 120.

The casing section 100 is provided with a bore 122 in coaxial relation with piston 106 and open at one end to a chamber 123 which is connected to the atmosphere by an exhaust port 124 and open at the opposite end to a chamber 125. Slidably mounted in bore 122 is a piston 126 formed on the lower end of rod 112, said piston having a stem 127 slidably mounted in a bore 128 connecting chamber 125 to a release valve chamber 129, said chambers being also connected by a small passage 130. Chamber 129 is connected by a pipe 143 and branch pipes 143a and 143b to the trailer brake cylinders 13 and 14, respectively. Piston 126 and stem 127 are provided with an axial bore 131 for connecting chamber 129 to chamber 123. Piston 126 is further provided with a packing cup 132 which has sealing and sliding contact with the wall of bore 122 and which is clamped to said piston by a follower 133 and a nut 134 having screw-threaded engagement with stem 127.

Formed in casing section 100 is a chamber 135 situated beneath chamber 129 and separated therefrom by a plug member 136 having screw-threaded engagement with said casing section. The member 136 has a bore 137 which is coaxial with the piston stem 127. Slidably mounted in the bore 137 is a fluted stem 138 having formed at one end thereof an exhaust valve 139 which is disposed in chamber 129 for seating cooperation with the end of the piston stem 127. The other end of stem 138 extends into the chamber 135 wherein a supply valve 140 is provided on the end of said stem for cooperation with a seat 141 formed on member 136 to control communication between said chamber, to which trailer reservoir 12 is connected by a pipe 142, and the chamber 129 to which the trailer brake cylinders 13 and 14 are connected by a pipe 143 having branches 143a and 143b. The supply valve 140 is secured to stem 138 by a nut 144 having screw-threaded engagement with said stem. The outer end wall of chamber 135 is formed by a disc shaped check valve 145 which cooperates with a seat 146 formed on a rubber gasket 147 disposed between the casing section 100 and the cover 102. Supported by the check valve 145 and bearing against the supply valve 140 is a spring 148 for urging each of said valves to a seated position.

Operation

In operation, let it be assumed that the main reservoir 4 is charged with fluid under pressure, the cut-out cock 2 is in its open position in which it is shown in the drawing, and the pedal 16a of the operator's control device 1 is moved to an elevated or brake release position, in which it is also shown in the drawing, by pressure of spring 78.

With the pedal 16a in the brake release position spring 47 will be expanded to permit spring 44 to actuate piston 34 to permit closing of valve 28 by spring 33 and to move stem 35 out of engagement with the exhaust valve 22 whereupon the tractor brake cylinders 5 and 6 will be open to atmosphere through pipe 30, chamber 23, past the open exhaust valve 22, through bore 36 in the piston 34 and the stem 35 to chamber 37 and thence through the slot 39 in cover 38, whereby the brakes on the tractor will be released.

At the same time the spring 78 will urge flange 75 of spring cage 76 against the flange 73 of spring cage 71 to hold the latter flange in contact with stop 74, to in turn hold the piston 63 in its lower position in which the nut 68 engages stop 70. When the piston 63 thus occupies its lower position, the stem 64 engages the exhaust valve 53 to close communication between the brake pipe 7 and the atmosphere. Also when the piston 63 occupies its lower position it is effective through stems 64 and 52 to unseat the supply valve 58 from its seat 59. With the supply valve 58 unseated, fluid under pressure from the main reservoir 4 will flow to the brake pipe 7 on the tractor and thence to the brake pipe 10 on the trailer. Fluid under pressure from brake pipe 10 flows to chamber 120 in the automatic control valve 11 on the trailer thence past the check valve 145 to chamber 135 and from said chamber through the pipe 142 to the trailer reservoir 12 to charge said reservoir to substantially the pressure in the brake pipe 7, 10 and main reservoir 4. At the same time fluid under pressure flows from chamber 120 through passage 121 to chamber 119, and when it is increased to substantially the same degree as in the main reservoir 4, moves the piston 106 upward against the stop 118. When the piston 106 occupies its upper position it is effective through stem 112 and disc 113 to maintain the piston 126 and the stem 127 in a raised position in which the stem 127 is out of engagement with the exhaust valve 139 which permits spring 148 to seat the supply valve 140. With the stem 127 moved out of engagement with the exhaust valve 139 a communication is established from the trailer brake cylinders 13 and 14 to atmosphere through the branch pipes 143a and 143b, pipe 143, chamber 129, past the open exhaust valve 139 through the bore 131 to chamber 123 and thence through the exhaust port 124, whereby the brakes on the trailer will be released.

Thus, with the pedal 16a in the brake release position, the brakes on both the tractor and trailer will be released, and the brake pipe 7, 10 and the trailer reservoir 12 will be charged with fluid under pressure from the main reservoir 4 on the tractor.

If it is now desired to apply the brakes on both the tractor and trailer at the same time, since the cock 2 is in its open position, the operator will depress foot pedal 16a to rock the operating lever 79 counterclockwise about shaft 80, the right hand end of said lever moving the sleeve 76 against spring 78 during such movement. As the left-hand end of the operating lever 79 moves downward said lever acting through the lugs 46 on the spring cage 45 will correspondingly displace said cage against spring 47 and increase the pressure of said spring against piston 34. When the pressure of spring 47 is increased to a degree sufficient to overcome the force of spring 44 acting beneath piston 34, said piston and stem 35 will move downward until said stem engages the exhaust valve 22 which closes the exhaust communication from the tractor brake cylinders 5 and 6. Further downward movement of the left-hand end of the operating lever 79 will then cause the stem 21 to move the exhaust valve 22 downward to unseat supply valve 28 and permit fluid under pressure to flow from main reservoir 4 to the tractor brake cylinders 5 and 6 by way of pipe and passage 27, through chamber 26, past the unseated supply valve 28, through bore 18 to chamber 23 and thence through the pipe 30 and branch pipes 30a and 30b for thereby applying the tractor brakes. Fluid under pressure from chamber 23 also flows through the small passage 24 to chamber 25 beneath piston 34. When the pressure beneath piston 34, together with the force of spring 44 exceeds the downward pressure of spring 47 said piston and stem 35 will be moved upward further compressing spring 47. Upward movement of stem 35 permits spring 33 to move stem 21 upward maintaining the exhaust valve 22 in contact with stem 35 until the supply valve 28 is seated, thus terminating the supply of fluid under pressure to the tractor brake cylinders 5 and 6 and chamber 25 and since the pressure of spring 47 is now just counterbalanced movement of piston 34 will cease with the release valve 22 still seated. Thus it is seen that the pressure obtained in the tractor brake cylinders 5 and 6 and chamber 25 is limited in accordance with the amount of pedal movement imparted to pedal 16a by the operator.

When it is desired to reduce the pressure in tractor brake cylinders 5 and 6 the operator will reduce the foot pressure on pedal 16a to permit spring 78 to actuate said lever to correspondingly reduce the pressure of spring 47 on piston 34. The pressure of fluid in chamber 25 together with the force of spring 44 will then move the piston 34 and stem 35 away from exhaust valve 22, which is held against movement by the seated supply valve 28, thus establishing a communication between the tractor brake cylinders 5 and 6 and atmosphere in a manner hereinbefore explained for releasing fluid under pressure from said cylinders. At the same time, fluid under pressure in chamber 25 beneath the piston 34 will be permitted to flow through the small passage 24 to chamber 23 and to the atmosphere along with that from the truck brake cylinders 5 and 6. When the pressure in the chamber 25 and beneath the piston 34 has thus reduced sufficiently for the downward force of spring 47 acting on said piston to exceed the upward pressure acting thereon, said piston and stem 35 will be moved downward until said stem engages exhaust valve 22 which terminates the release of fluid under pressure from truck brake cylinders 5 and 6 and thereby limits the reduction in such pressure to a degree corresponding to the position of pedal 16a.

If it is desired to completely release the brakes in the tractor and trailer the operator will remove his foot from pedal 16a to permit spring 78 to return lever 79 to the release position shown in the drawing whereupon the spring 47 is permitted to expand to reduce the force on piston 34 to a degree which is less than the opposing pressure of spring 44, whereupon said opposing pressure will move piston 34 and stem 35 upward away from the exhaust valve 22 to connect the tractor brake cylinders 5 and 6 to atmosphere in the manner hereinbefore described. The pressure in the tractor brake cylinders will then reduce to atmospheric pressure to permit a complete release of the tractor brakes.

It is thus seen that fluid under pressure may be supplied to and released from the tractor brake cylinders for varying the pressure therein and thereby the degree of brake application on the tractor in accordance with the position of foot pedal 16a. At the same time that the left-hand end of operating lever 79 is moved downward in response to foot pressure applied to pedal 16a for applying the brakes on the tractor, the right hand end of said lever and sleeve 76 is moved upward as above mentioned which permits spring 72 to expand, since as the flange 75 of spring cage 76 is moved upward, flange 73 of spring cage 71 will be moved upward therewith by the compressive force of spring 72 and will remain in contact with flange 75. The resulting expansion of small spring 72 reduces the pressure thereof on the upper side of piston 63. The brake pipe pressure present in chamber 56 and beneath piston 63 will then be effective to move said piston and stem 64 upward which permits spring 62 to move stem 52 upward maintaining the exhaust valve 53 seated on stem 64 until supply valve 58 is seated thus terminating the supply of fluid under pressure from the main reservoir 4 to the brake pipes 7 and 10. Further upward movement of piston 63 and stem 64 then moves said stem away from exhaust valve 53 to establish a communication from brake pipe 7, 10 to the atmosphere through chamber 54, bore 65 in stem 64, chamber 37, and slot 39 in cover 38. At the same time, brake pipe pressure present in chamber 56 and beneath piston 63 will be permitted to flow through the small passage 55 to chamber 54 and to atmosphere along with that from the brake pipe 7, 10. The brake pipe pressure will thus reduce until the pressure in chamber 56 and beneath piston 63 is reduced to slightly below the force of spring 72 acting on the top of said piston at which time said piston and stem 64 will be moved downward until said stem engages exhaust valve 53 which terminates the flow of fluid under pressure from the brake pipe to the atmosphere. The pressure in the brake pipes 7, 10 is thus reduced to a degree corresponding to the depressed position of the pedal 16a.

When the pressure in the brake pipes 7, 10 is reduced as just described, a corresponding reduction in pressure will occur in chamber 119 of the automatic control valve 11 on the trailer by reason of said chamber's connection to the brake pipe through passage 121 and chamber 120. When the pressure in chamber 119 beneath piston 106 is reduced as explained above, the force of spring 117 will move said piston downward thus permitting expansion of said spring until the reduced force of said spring balances the reduced brake pipe pressure retained in chamber 119. Thus the downward movement of piston 106 is in accordance with the amount of reduction in brake pipe pressure effected by the operation of operator's control valve device 1.

The downward movement of piston 106 permits spring 115 to move disc 113, rod 112, piston 126 and stem 127 downward maintaining said disc in contact with the top face of piston 106. As the stem 127 thus moves downward it will first engage the exhaust valve 139 to close communication between the trailer brake cylinders 13 and 14 and chamber 129, and bore 131 in said stem which is open to atmosphere through port 124, and will then cause stem 138 to move downward to unseat supply valve 140 and permit fluid under pressure to flow from trailer reservoir 12 to the trailer brake cylinders by way of pipe 142 chamber 135, past the unseated supply valve 140, through bore 137 to chamber 129 and thence through pipe 143 and branches 143a and 143b. Fuid under pressure from chamber 129 also flows through the small passage 130 to chamber 125 and beneath piston 126. When the pressure of fluid thus obtained beneath piston 126 slightly exceeds the downward pressure of spring 115 acting on said piston through rod 112 and disc 113, said piston and stem 127 will be moved upward compressing said spring until the pressure of said spring balances the pressure acting beneath said piston. Upward movement of stem 127 permits spring 148 to move stem 138 upward maintaining exhaust valve 139 in contact with stem 127 until supply valve 140 is seated thus terminating the supply of fluid under pressure to the trailer brake cylinders 13 and 14. Thus it is seen that the pressure obtained in the trailer brake cylinders 13 and 14 is limited in accordance with the amount of reduction in pressure in the brake pipe 7, 10 and therefore in accordance with the position of the pedal 16a. It will further be seen that the straight air portion 15a of the operator's control device and the automatic portion 16 thereof operate in unison and that the brakes on both the tractor and trailer will be applied substantially in unison and to substantially the same degree corresponding to the position of pedal 16a.

It should be noted at this point that the disc check valve 145 prevents back flow of fluid under pressure from the trailer reservoir 12 to chamber 120 and brake pipe 10 when the pressure of fluid in the brake pipe 7, 10 is reduced to effect a brake application as described above, but permits said reservoir to be charged with fluid under pressure past said disc check valve when the brake pipe pressure exceeds that in said reservoir.

When the foot pressure on pedal 16a is reduced to permit a return thereof toward its normal or release position for releasing fluid under pressure from the tractor brake cylinders 5 and 6, as above described, the main reservoir 4 will be connected to brake pipe 7, 10 in a manner hereinbefore described. As brake pipe pressure then increases in chamber 120 of the automatic control valve 11, the disc check valve 145 will be lifted from its seat against the force of spring 148 to permit the trailer reservoir 12 to be recharged with fluid under pressure from the brake pipe 10. At the same time, brake pipe pressure will be increased in chamber 119 and beneath piston 106. When this pressure exceeds the force of spring 117 it will be effective to move said piston upward until it moves into engagement with stop 118. The upward movement of piston 106 carries with it rod 112, piston 126, and stem 127 by reason of the engagement of the upper face of piston 106 by the disc 113 which is rigidly fastened to rod 112. The upward movement of stem 127 moves said stem away from exhaust valve 139 thus establishing the communication from trailer brake cylinders 13 and 14 to atmosphere for releasing the fluid under pressure from said cylinders for in turn releasing the trailer brakes.

From the foregoing it is seen that when the operator depresses foot pedal 16a fluid will be supplied to both the truck and trailer brake cylinders at a pressure substantially proportional to the amount of depression of said pedal from its release position and when the operator releases the foot pressure on said pedal, the pressure of fluid in both the truck and trailer brake cylinders will be reduced in accordance with the change in position of said pedal.

When the trailer is empty it may be desired to prevent an application of the trailer brakes when the brakes on the tractor are applied, since the tractor brakes will be sufficient to properly control both vehicles under this condition. For safety sake, it is, however, desirable that the trailer brakes will be automatically applied in the event of the trailer breaking loose from the tractor or rupturing of the hose connection between said tractor and trailer in order that the trailer will be promptly stopped to avoid wrecking thereof.

To secure braking on the tractor only and yet provide for braking on the trailer in case of a break in two or a rupture of the hose between the tractor and trailer, it is merely necessary to move handle 89 of cutout cock 2 clockwise to the position indicated on the drawing by the dot and dash line 89a. In this position of handle 89 flow of fluid under pressure from main reservoir 4 on the tractor through cut-out cock 2 to the trailer brake pipe 10 and the automatic control valve 11 on the trailer is interrupted, but the trailer reservoir 12 will be charged from main reservoir 4 on the tractor through the check valve 3, connected in by-passing relation to the cut-out cock 2. When the trailer reservoir thus becomes charged to substantially the pressure in the tractor reservoir 4 and in brake pipe 7 ahead of the cock 2, spring 99 will seat the check valve 97 to prevent reverse flow from the trailer brake pipe 10 to the operator's control device 1.

When, with the cock 2 closed, the operator depresses foot pedal 16a to apply the tractor brakes the pressure in brake pipe 7 at the left hand side of cut-out cock 2 will be reduced in the same manner as before described but the closed check valve 97 will prevent flow of fluid under pressure from the trailer brake pipe 10 and therefore prevent a brake application on the trailer. If however the coupling between the tractor and trailer becomes broken or the hose ruptured from any cause, there will be a rapid reduction in pressure in the trailer brake pipe 10 which will cause operation of the automatic control valve 11 to effect an application of the trailer brakes in the same manner as hereinbefore described.

It will now be seen that at the will of the operator fluid under pressure may be admitted to both the tractor and trailer brake cylinders simultaneously, or to the tractor brake cylinders alone which may be desirable when no load is being carried on the trailer.

It will further be noted that even when the trailer is loaded and the cock 2 open, if the hose between the tractor and trailer should break for any reason the trailer brakes will be automatically applied.

Having now described my invention, what I claim as new and desire to secure by Letters Patent, is:

1. In combination, first and second control pipes, a main reservoir and an operator's control means, said operator's control means comprising a casing having a chamber charged with fluid under pressure from said main reservoir, two self-lapping valve means for supplying fluid under pressure from said chamber to said first and second control pipes respectively, a pair of springs operative in response to an increase in force thereof to render said self-lapping valve means effective to supply fluid under pressure to said control pipes, a third spring operative in an expanded position to compress one of said pair of springs to render one of said self-lapping valve means operative to supply fluid under pressure to said first control pipe, a shaft carried by said casing, a control lever carried by said shaft and rockable to compress the other said pair of springs and said third spring, to render the other of said self-lapping valve means operative to supply fluid under pressure to said second control pipe and to render said one self-lapping valve means operative to reduce the pressure in said first control pipe, and means for rocking said control lever.

2. A combined straight-air and automatic operator's control means for tractor-trailer vehicles comprising a casing having a pair of chambers, a first control pipe connected to one of said chambers, a second control pipe connected to the other of said chambers, supply valve means for supplying fluid under pressure to each of said chambers and exhaust valve means for releasing fluid under pressure from each of said chambers, spring means for closing each of said supply valve means, a shaft carried by said casing, a rockable lever mounted on said shaft, a spring disposed between said lever and one of said exhaust valve means for providing a yieldable connection between said lever and said one exhaust valve means, a second spring for maintaining said one exhaust valve means in a release position, a spring cage, a third spring disposed between the other of said exhaust valve means and said spring cage for maintaining the said other exhaust valve means closed and the one of said supply valve means associated with said other exhaust valve means open to supply fluid under pressure to one of said chambers and said first control pipe, and a fourth spring disposed between said spring cage and said casing for normally maintaining said third mentioned spring under compression, said rockable lever being rockable about said shaft for increasing the compression of said one, said second and said fourth mentioned springs and decreasing the compression on said third mentioned spring to close the said one exhaust valve means and open the said other supply valve means and to close said one supply valve means and open the said other exhaust valve means, and manual means for rocking said lever about said shaft.

NORMAN G. CADMAN.

REFERENCES CITED

The following references are of record in the file of this patent:

UNITED STATES PATENTS

| Number | Name | Date |
| --- | --- | --- |
| 552,793 | Stoner | Jan. 7, 1896 |
| 735,544 | Mann | Aug. 4, 1903 |
| 811,765 | Corey | Feb. 6, 1906 |
| 962,517 | McElroy | June 28, 1910 |
| 1,218,479 | Savio | Mar. 6, 1917 |
| 1,827,849 | Kazenmaier | Oct. 20, 1931 |
| 1,940,550 | Kazenmaier | Dec. 19, 1933 |
| 1,957,891 | Kazenmaier | May 8, 1934 |
| 2,289,559 | Turek | July 14, 1942 |
| 2,324,690 | Gardiner et al. | July 20, 1943 |
| 2,329,742 | Bush et al. | Sept. 21, 1943 |
| 2,392,729 | Edge | Jan. 8, 1946 |